N. PARA.
AUTOMOBILE RADIATOR.
APPLICATION FILED MAR. 18, 1921.
1,408,631.
Patented Mar. 7, 1922.
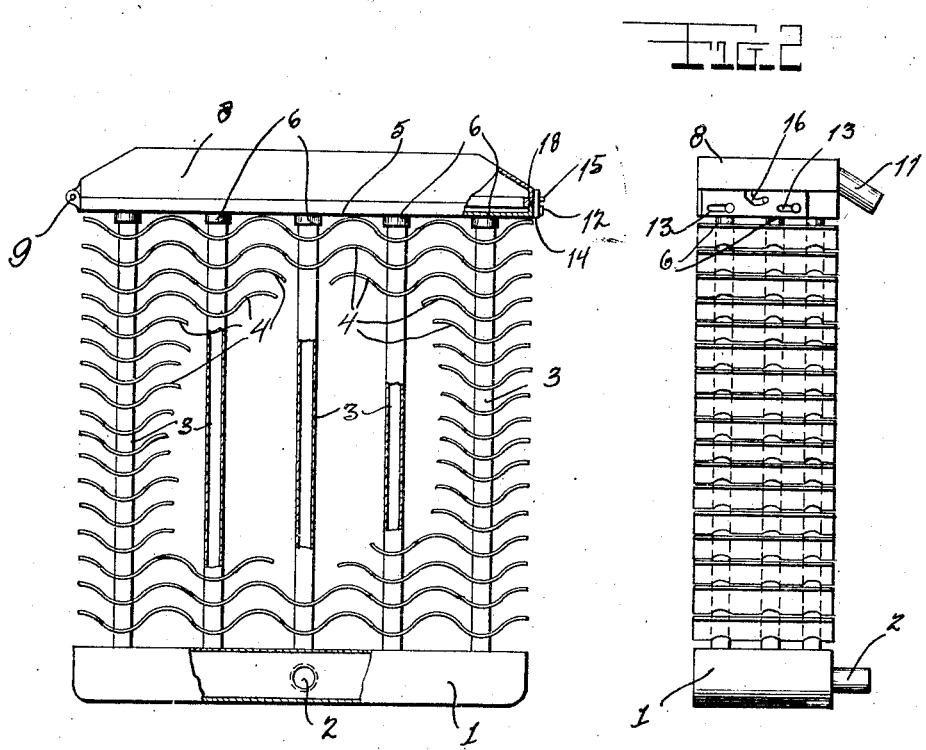
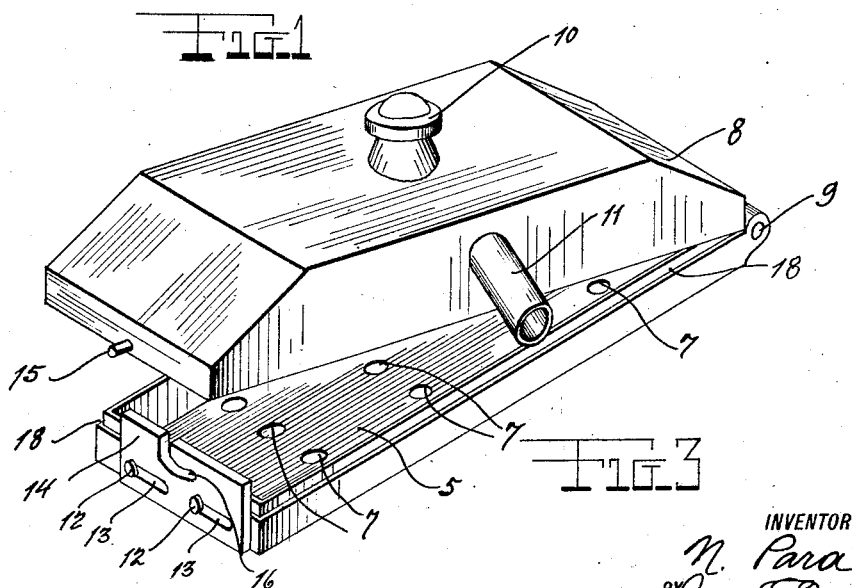
INVENTOR
N. Para
BY
ATTORNEY

UNITED STATES PATENT OFFICE.

NICHOLAS PARA, OF DETROIT, MICHIGAN.

AUTOMOBILE RADIATOR.

1,408,631.      Specification of Letters Patent.      Patented Mar. 7, 1922.

Application filed March 18, 1921. Serial No. 453,227.

*To all whom it may concern:*

Be it known that I, NICHOLAS PARA, a citizen of the United States, residing at Detroit, in the county of Wayne and State of Michigan, have invented certain new and useful Improvements in Automobile Radiators, of which the following is a specification.

The main objects of this invention is the provision of a radiator for automobiles of novel construction and design, giving access to the interior thereof for the purpose of cleaning, repairing, and other objects as may be necessary.

The above and other objects will become apparent in the description below, in which like-named characters of reference refer to like-named parts in the drawings.

Referring briefly to the drawings, Fig. 1 is a front elevational view, partly in section, of my radiator.

Fig. 2 is a side elevational view of the same.

Fig. 3 is an enlarged perspective view of my header.

Referring now in detail to the drawings, the numeral 1 represents the base of my radiator having the usual outlet 2 and from which extend upright tubes 3. The usual wind-distributing vanes are shown at 4.

The base of my header is indicated at 5, and is provided with holes 7 surrounded on the lower face of the base 5 by nipples 6 adapted to snugly fit on the upper ends of the tubes 3. The upper portion of my header is represented at 8, and is hingedly attached at 9 to said base portion. The usual radiator cap is indicated at 10, and the header outlet at 11.

Pins 12 are rigid with and extend from one side of the base 5, and are engaged in slots 13 in a plate 14 which is thereby made slidable with respect to said header. A pin 15 extends rigidly from the side of the upper member 8, and is adapted to engage the curved slot 16 in the plate 14. A shoulder 18 surrounds the upper edge of the base 5, upon which the upper member 8 is adapted to rest snugly.

Assuming the upper member to be in the raised position shown in Fig. 3, the following is the manner of lowering the same into locked position. The upper member 8 is first lowered so that it sits upon the shoulder 18, the pin 15 having entered the slot 16. The plate 14 is then moved toward the left, whence the slot 16, after the manner of a cam, forces the member 8 tightly against the shoulder 18, locking the said member and base 5 securely together. It is apparent that in order to lift the said upper portion 10 it is but necessary to perform the aforementioned operations in the reverse sequence.

I claim:

1. A device of the class described comprising, as part of an automobile radiator, a header comprising a base member and an upper member hinged together, a plate slidably mounted on said base member and having a curved slot therein, and a pin rigid with said upper member adapted to engage said slot.

2. A device of the class described comprising, as part of an automobile radiator, a header comprising a base member and an upper member hinged together, pins rigid with the side of said base member, a plate having slots therein engaging said pins, said plate being slidable with respect to said base member, an additional slot in said plate, said additional slot being curved, and a pin rigid with said upper member adapted to engage said additional slot.

In witness whereof I affix my signature.

NICHOLAS PARA.